Oct. 23, 1956     H. S. HANSEN     2,767,915
LOGARITHMIC COMPUTER
Filed Jan. 7, 1954
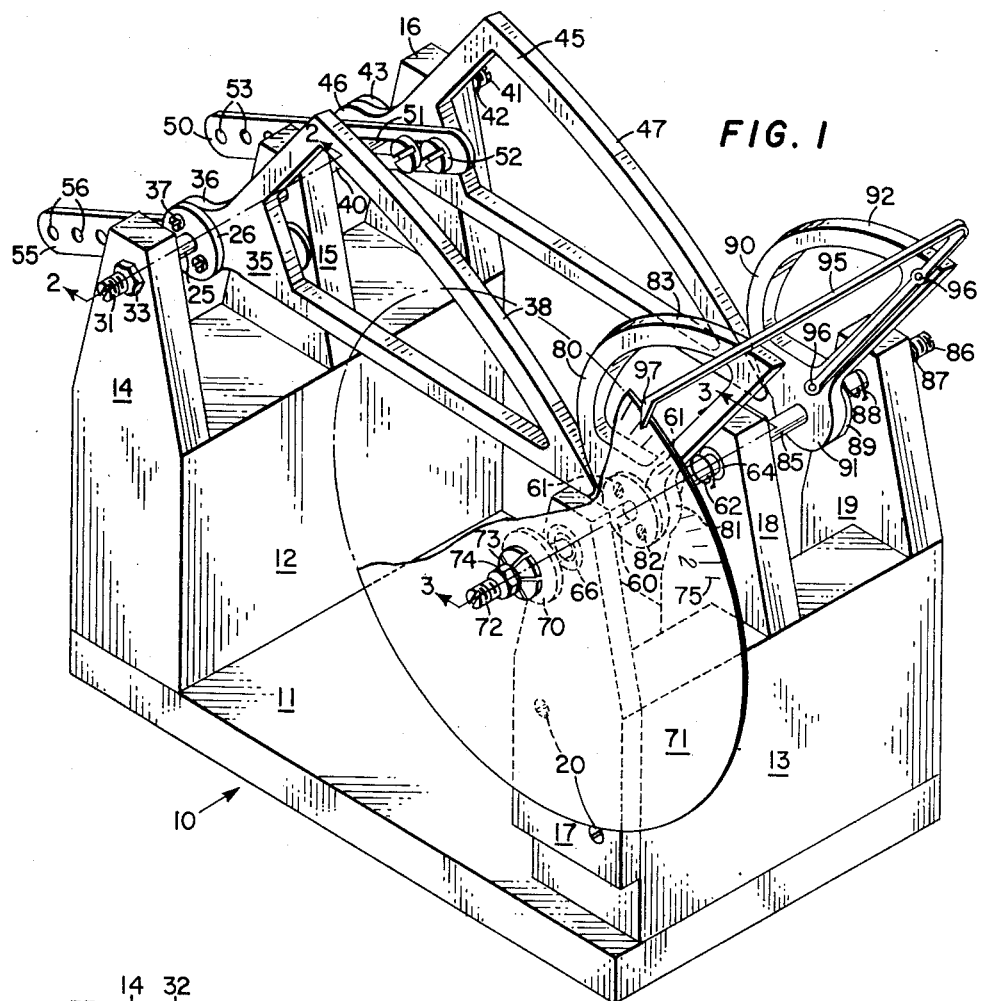
INVENTOR
HAROLD S. HANSEN
BY
ATTORNEYS

United States Patent Office 2,767,915
Patented Oct. 23, 1956

2,767,915

LOGARITHMIC COMPUTER

Harold S. Hansen, Pacific Palisades, Calif.

Application January 7, 1954, Serial No. 402,827

1 Claim. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

The present invention relates to a mechanical analogue computer and more particularly to a mechanical analogue computer utilizing an arrangement wherein two cooperating indicating members are actuated in such a manner that movements thereof are respectively proportional to the logarithm of any two signals which may be applied to the device.

In many instances, it is desirable to have a continuous indication of the ratio or product of two variables. For example, in engine testing, the fuel-air ratio is an important performance parameter which must be continually checked and adjusted. Since the flow rates encountered in such testing are often high and continuously varying, it is desirable to employ a device which gives a visible indication of the fuel-air ratio at all times without requiring the taking of separate readings and mathematical computations with the attendant inconvenience and time delay involved.

In the invention device, two indicating means cooperate to give a continuous visible indication either of the product or quotient of two signals. The signals may be in various forms such as pressure, temperature or electrical voltages, a suitable means being provided if necessary to produce movement of the driving cams of the device which is proportional to the signals. The cooperating cam surfaces of the device are so designed as to produce movement of the driven cams thereof which is proportional to the logarithm of the signals. A logarithmic scale on one of the indicating means is utilized to show the logarithmic relationship between the two signals. As in a slide rule, multiplication of the signals may be obtained by addition of the logarithms thereof, and division of the signals may be obtained by subtraction of the logarithms thereof. In this manner, a simple and accurate device is provided for either multiplying or dividing any two signals regardless of whether the signals are constant or varying and regardless of whether they are dependent on or independent of one another.

An object of the present invention is the provision of a new and novel mechanical analogue computer which gives a continuous visual indication of the product or quotient of two signals.

Another object is to provide a new and novel mechanical analogue computer which eliminates the necessity of taking separate readings or making mathematical computations.

A further object of the invention is the provision of a new and novel mechanical analogue computer which is simple and inexpensive in construction, yet rugged and accurate in operation.

Other objects and many of the attendant advantages of this invention will be readily appreciated as the same becomes better understood by reference to the following detailed description when considered in connection with the accompanying drawings wherein:

Fig. 1 is an isometric view of the invention device with a portion thereof broken away for the purpose of illustration;

Fig. 2 is a sectional view of a portion of Fig. 1 taken on the line 2—2 looking in the direction of the arrow with certain members removed; and Fig. 3 is a sectional view of a portion of Fig. 1 taken on the line 3—3 looking in the direction of the arrows with certain members removed.

Referring now to the drawing, wherein like reference characters designate corresponding parts in the views, there is shown in Fig. 1 a base indicated generally by reference numeral 10 comprising a plate 11 having upstanding bearing blocks 12 and 13 suitably fixed to the end portions thereof as by welding or the like. Block 12 has formed integral therewith three spaced arms 14—16 extending upwardly therefrom, and block 13 has two arms 18, 19 formed integral therewith. A third arm 17 is secured by means of screws 20 to a lateral portion of block 13 to facilitate assembly of the device as will be hereinafter more fully described.

A spindle 25 is pivotally supported by arms 14, 15, and a radially extending flange 26 is formed integral with the spindle at an intermediate portion thereof. Referring to Fig. 2, wherein certain members are removed, it may be seen that the end portions of the spindle are tapered, one end portion 27 being journaled in a complementary conical pivot bearing seat 28 formed in arm 15, and the opposite end portion 29 being journaled in a complementary conical pivot bearing seat 30 formed in the end of a set screw 31. Screw threads are formed on the outer periphery of screw 31 and the screw is positioned within a correspondingly threaded opening 32 provided in arm 14. A lock nut 33 is threaded on the outer end of screw 31, and it is apparent that by loosening the lock nut and advancing or retracting the screw within opening 32, the friction between the ends 27 and 29 of spindle 25 and bearing portions 28 and 30 respectively may be selectively adjusted.

When the desired amount of friction has been obtained by suitably adjusting the position of screw 31, nut 33 may be advanced to the position shown to lock screw 32 in position. By adjusting the amount of friction between spindle 25 and its bearings, substantially all backlash may be eliminated from the mechanical linkage of the device whereby accurate readings may be obtained therewith.

Referring again to Fig. 1, a cam member 35 has a rounded end portion 36 which is rigidly secured to flange 26 by means of screws 37 whereby the cam member is rotatably fixed to spindle 25. Member 35 has a curved driving cam surface 38 formed on the outer periphery thereof, and the central portion of the cam member is cut out in order to make the cam member as light as possible and yet insure that it has sufficient structural strength.

A spindle 40 similar to spindle 25 has one tapered end journaled in a conical pivot bearing seat formed in arm 15 and the opposite tapered end journaled in a conical pivot bearing seat formed in the end of a set screw 41 which is similar to set screw 31 and which is mounted in arm 16 in the same manner as screw 31 is mounted in arm 14. A lock nut 42 is threaded on the outer end of the screw for locking the screw in position, and therefore, the friction between spindle 40 and the associated bearing portions may be adjusted by means of screw 41.

A radially extending flange 43 similar to flange 26 is formed integral with spindle 40 at an intermediate portion thereof and a cam member 45 has a rounded end portion 46 which is rigidly secured to the flange by means of screws (not shown) similar to screws 37. Member 45 has a curved driving cam surface 47 formed on the outer periphery thereof, and the central portion of the cam member is cut out.

An elongated extension arm 50 has a slot 51 formed therein through which spindle 40, which is fixed for rotation with said arm, extends, and the extension arm is secured to member 45 by means of screws 52 which pass through slot 51. A plurality of openings 53 are formed in arm 50 and are spaced therealong whereby a suitable connecting means may be secured through one of openings 53 to give the desired leverage from the connecting means to cam member 45.

An elongated extension arm 55 similar to arm 50 is provided with a plurality of openings 56 and a slot (not shown) through which spindle 25, which is fixed for rotation with arm 55, extends. A suitable connecting means may be secured through one of openings 56, and arm 55 is secured to cam member 35 by means of screws (not shown) in a manner similar to that in which arm 50 is secured to cam member 45.

It is accordingly seen that each of arms 50 and 55 with their respective attached cam members 45 and 35 rotate as a unit with spindles 40 and 25, respectively, on the application of an upward or downward force on the free ends of arms 50 and 55 through their connecting means.

A spindle 60 is pivotally supported by arms 17, 18, and a radially extending flange 61 is formed integral with the spindle at an intermediate portion thereof. A coil spring 62 is secured at one end thereof to arm 18 and at the opposite end thereof to the spindle so as to urge the spindle in a counterclockwise direction as seen in Fig. 1. Referring now to Fig. 3, wherein certain members are removed, it may be seen that a first reduced cylindrical end portion 63 of spindle 60 is journaled in a ball bearing 64 mounted in arm 18, and a collar 65 formed integral with spindle 60 abuts a stepped ball bearing 66 mounted in arm 17, the shoulder 67 of bearing 66 preventing movement of the spindle to the left when in assembled position.

A removable collar 70 is pinned to spindle 60, and a substantially disk-shaped dial 71 is rotatably mounted on the spindle. A second end portion 72 of spindle 60 is provided with screw threads on the outer periphery thereof, and a conventional spring washer 73 is threaded thereon whereby the washer is adapted to clamp dial 71 against collar 70 such that the dial will rotate with spindle 60. A lock nut 74 is threaded on end portion 72 and is adapted to lock washer 73 in position. It is evident that by loosening the lock nut and unscrewing washer 73, the dial 71 may be selectively rotated to a desired position with respect to spindle 60 and that the washer and lock nut may then be returned to the positions shown in the drawing to lock the dial in position. As seen in Fig. 1, a portion of dial 71 has been cut away for the purpose of illustration, but the outline of the dial is indicated in phantom line. It should also be noted that a logarithmic scale 75 is positioned on the dial adjacent the outer periphery thereof, the scale extending about an arc of the dial as determined by the relative rotation of the components of the device. The scale may be calibrated as either a single-cycle or a multicycled logarithmic scale in accordance with the range of values it is desired to indicate.

A cam member 80 has a rounded end portion 81 which is rigidly secured to flange 61 by means of screws 82 whereby member 80 is rotatably fixed to spindle 60. Cam member 80 has a curved driven cam surface 83 formed on the outer periphery thereof which engages driving cam surface 38, and the central portion of the cam member is cut away. Since spring 62 urges spindle 60 in a counterclockwise direction as seen in Fig. 1, and since cam member 80 is rotatably fixed to the spindle, it is apparent that driven cam surface 83 is urged into engagement with cam surface 38 at all times.

A spindle 85 similar to spindles 25 and 40 has one tapered end journaled in a conical pivot bearing seat formed in arm 18 and the opposite tapered end journaled in a conical pivot bearing seat formed in the end of a set screw 86 which is similar to set screws 31 and 41 and which is mounted in arm 19 in the same manner as the other set screws are mounted in the respective arms. A lock nut 87 is threaded on the outer end of the screw for locking the screw in position, and therefore, the friction between spindle 85 and the associated bearing portions may be adjusted by means of screw 86. A coil spring 88 is secured at one end thereof to arm 19 and at the opposite end thereof to spindle 85 so as to urge the spindle in a counterclockwise direction as seen in Fig. 1.

A radially extending flange 89 similar to flanges 26 and 43 is formed integral with spindle 85 at an intermediate portion thereof and a cam member 90 has a rounded end portion 91 which is rigidly secured to the flange by means of screws (not shown) similar to screws 82. Member 90 has a curved driven cam surface 92 formed on the outer periphery thereof which is shown in engagement with driving cam surface 47. Since spring 88 urges spindle 85 in a counterclockwise direction as seen in Fig. 1, and since cam member 90 is rotatably fixed to spindle 85, it is apparent that cam surface 92 is urged into engagement with cam surface 47 at all times.

An elongated pointer 95 is secured by suitable means such as pins 96 to the lateral portion of cam member 90 such that the pointer is fixed for rotation with the cam member. The pointer extends laterally adjacent the outer periphery of dial 71 and has a pointed end portion 97 formed at right angles thereto such that the end portion is disposed in a plane parallel to the plane of the dial and is positioned a small distance from the face of the dial and scale 75 thereon. In this manner, end portion 97 is adapted to indicate a specific reading on scale 75.

In operation, a suitable connecting means is secured to arm 55 such that cam member 35 is rotated in proportion to variations of a first signal. Rotations of cam member 38 cause rotation of dial 71 through the intermediary of cam member 80 and spindle 60, and the driven cam surface of member 80 and cooperating cam surface 38 are so shaped that rotations of the dial are proportional to the logarithm of the value of the first signal. A suitable connecting means is also secured to arm 50 such that cam member 45 is rotated in proportion to variations of a second signal. Rotations of cam member 45 cause rotation of pointer 95 through the intermediary of cam member 90, and the cooperating cam surfaces 47, 92 are so shaped that rotations of the pointer are proportional to the logarithm of the value of the second signal. Therefore, by suitably securing the respective connecting means to arms 50 and 55, the dial and pointer may be actuated so as to either effectively add or subtract the logarithms of the values of the two signals thereby either obtaining a product or a quotient of the two signals as the case may be. It should be noted that the driving cam surfaces of the device engage the driven cam surfaces thereof through a pure rolling motion thereby reducing the friction between the cam surfaces to a minimum and insuring accurate displacement of the driven cam members for given increments of rotation of the driving cam members.

As shown in Fig. 1 of the drawing, the cam members are in their initial position with no signals applied to the device. Upon actuation of extention arms 50 and 55 in an upward direction in response to signals, dial 71 and pointer 95 will respectively move in a counterclockwise direction as seen in the drawing and the logarithm of the signal applied to arm 50 will be subtracted from the logarithm of the signal applied to arm 55. If it should be desired to add the logarithms of the two signals, it is merely necessary to change the initial position of either cam 35 or 45 such that the shortest radius of curved surface 38 or 47 is aligned with the longest radius of either curved surface 83 or 92 on cams 80 and 90 respectively and to secure the connecting means to whichever of arms 50, 55 the initial position of which has been changed as aforementioned in order that such arm moves in a downward direction while the other arm moves in an upward direction.

In some instances, it may be desired to utilize the device to indicate the product or quotient of two variable physical characteristics which are measured in terms of another physical characteristic. For example, when it is desired to measure the flow of fluid through a conduit or the like as in the case where the flow of fuel or air to an engine is measured, the amount of fuel flow is measured in terms of a pressure differential between spaced points along the conduit since that is the most practical method of measuring the flow. Therefore, the fuel-air ratio is measured in engine testing by first measuring the pressure differentials in the fuel and air conduits and then calculating the fuel-air ratio according to the mathematical relationship which exists beween the pressure differentials and the amount of flow.

When the invention device is utilized for measuring fuel-air ratio, each measured pressure differential is transmitted to a separate conventional differential pressure converter connected to a suitable connecting means such as a Bourdon tube whereby the single pressure signal output of each differential pressure converter actuates a Bourdon tube which is in turn secured to and actuates one of the extension arms 50, 55.

It should be noted, however, that in the above example where the flow is measured in terms of pressure differenial which in turn supplies a signal to the invention device, the logarithm of the constant quantity K must also be considered and it is not possible merely to subtract the logarithm of one signal from the logarithm of the other.

When the signal furnished by the fuel flow is applied to arm 55 so as to urge the arm upwardly and the signal furnished by the air flow is applied to arm 50 to also urge the arm in an upward direction, the dial and pointer will both rotate in a counterclockwise direction and the logarithm of the air flow will be subtracted from the logarithm of the fuel flow, and the pointer will indicate the quotient of the value of the fuel flow divided by the value of the air flow. However, as pointed out above, the logarithm of the constant quantity K must also be added to the logarithm of the fuel flow. This is accomplished in the present device by loosening nut 74 and washer 73 and rotating dial 71 until the apex of end portion 97 of pointer 95 indicates the value of the constant K. When this initial setting has been made, washer 73 and nut 74 are again tightened in locking position, and the device is ready for operation such that readings may be made directly from scale 75.

It is apparent that dial 71 may be selectively adjusted such that any initial setting may be made to introduce a constant, and in this manner any two signals may be directly applied to the device and the product or quotient thereof determined, or one or more physical characteristics may be measured in terms of another physical characteristic and an initial setting made with the device in accordance with the mathematical relationship existing between the various characteristics.

It is evident from the foregoing that there is provided a new and novel mechanical analogue computer which gives a continuous visual indication of the product or quotient of two signals and which eliminates the necessity of taking separate readings or making mathematical computations once the device is in assembled position. The device is simple and inexpensive in construction, yet rugged and accurate in operation.

Obviously many modifications and variations of the present invention are possible in the light of the above teachings. It is therefore to be understood that within the scope of the appended claims the invention may be practiced otherwise than as specifically described.

I claim:

A mechanical analogue computer which comprises a base, a first spindle rotatably supported by a first pair of bearings mounted in said base, means for adjusting the friction between said first spindle and said first pair of bearings, a first flange formed integral with said first spindle, a first cam member secured to said first flange and having a first curved cam surface formed thereon, a first extension arm connected to said first cam member, a second spindle rotatably supported by a second pair of bearings mounted in said base, means for adjusting the friction between said second spindle and said second pair of bearings, a second flange formed integral with said second spindle, a second cam member secured to said second flange and having a second curved cam surface formed thereon, a second extension arm connected to said second cam member, a third spindle rotatably supported by a third pair of bearings mounted in said base, a third flange formed integral with said third spindle, a third cam member secured to said third flange and having a third curved cam surface formed thereon, a collar connected for rotation with said third spindle, a substantially disk-shaped dial rotatably mounted on said third spindle, resilient means for selectively clamping said dial against said collar, a fourth spindle rotatably supported by a fourth pair of bearings mounted in said base, means for adjusting the friction between said fourth spindle and said fourth pair of bearings, a fourth flange formed integral with said fourth spindle, a fourth cam member secured to said fourth flange and having a fourth curved cam surface formed thereon, an elongated pointer secured to said fourth cam member, the end portion of said pointer being positioned adjacent the outer periphery of said dial, resilient means urging said third cam surface into engagement with said first cam surface and said fourth cam surface into engagement with said second cam surface, said cam surfaces being so shaped that the rotational movements of said dial and said pointer are respectively proportional to the logarithms of the measured values of two physical characteristics individually applied as forces on said first and second extensions for rotation of said first and second cam members, respectively.

References Cited in the file of this patent

UNITED STATES PATENTS

| 2,651,456 | Highstone | Sept. 8, 1953 |

FOREIGN PATENTS

| 620,336 | France | Jan. 17, 1927 |
| 334,733 | Italy | Jan. 29, 1936 |